United States Patent [19]
Jia et al.

[11] Patent Number: 5,464,798
[45] Date of Patent: Nov. 7, 1995

[54] CERAMIC-ZEOLITE COMPOSITE MEMBRANES AND USE FOR SEPARATION OF VAPOR/GAS MIXTURES

[76] Inventors: Meng-Dong Jia, P.O. Box 914, Beijing, China, 100083; Richard D. Noble, 1262 Bear Mountain Ct., Boulder, Colo. 80303; John L. Falconer, 3885 17th St. Boulder, Colo. 80304

[21] Appl. No.: 201,472

[22] Filed: Feb. 24, 1994

[51] Int. Cl.$^6$ .................................. B01J 29/06
[52] U.S. Cl. .................................. 502/64; 502/4
[58] Field of Search ............................ 502/4, 64

[56] References Cited

U.S. PATENT DOCUMENTS

| | | | |
|---|---|---|---|
| 4,699,892 | 10/1987 | Suzuki | 502/4 |
| 4,827,071 | 5/1989 | Hazbun | 585/443 |
| 4,925,562 | 5/1990 | te Hennepe et al. | 210/500.25 |
| 5,019,263 | 5/1991 | Haag et al. | 210/500.25 |
| 5,069,794 | 12/1991 | Haag et al. | 210/650 |
| 5,100,596 | 3/1992 | Haag et al. | 502/4 |
| 5,157,005 | 10/1992 | Suppiah | 502/62 |
| 5,200,377 | 4/1993 | Zones et al. | 502/62 |
| 5,258,339 | 11/1993 | Ma et al. | 502/4 |

FOREIGN PATENT DOCUMENTS

| | | | |
|---|---|---|---|
| 0481660A1 | 4/1992 | European Pat. Off. | B01D 71/02 |

*Primary Examiner*—Asok Pal
*Attorney, Agent, or Firm*—Dick and Harris

[57] ABSTRACT

A zeolite composite membrane apparatus and method for preparing a novel continuous zeolite composite membrane. The method described results in formation of a thin polycrystalline continuous zeolite layer on the inner wall of a substrate container. The container may be a cylinder. After calcination, the zeolite composite membrane shows high permeability and high selectivity for single gas and for vapor/gas mixtures. The zeolite composite membrane formed has improved separation characteristics of shape selectivity and selective adsorption. The geometry of the membrane provides a high permeation area to volume ratio. The membrane is useful for high temperature gas separations and for membrane reactor applications.

14 Claims, 7 Drawing Sheets

CERAMIC-ZEOLITE COMPOSITE MEMBRANES AND USE FOR SEPARATION OF VAPOR/GAS MIXTURES

FIELD OF THE INVENTION

This invention relates to ceramic-zeolite membranes. Specifically, this invention relates to the synthesis of a novel ceramic-zeolite membrane on the inner surface of a container, and its use for the selective separation of vapor from vapor/gas mixtures. The membrane of this invention formed within a cylindrical container has a large permeation area per unit volume compared to flat sheet membranes due to its cylindrical form. The present invention achieves vastly improved separations and has wide applications in high temperature separations and in membrane reactors.

BACKGROUND OF THE INVENTION

Zeolites are crystalline, hydrated aluminosilicates of Group I and II elements. Structurally, zeolites comprise a framework based on an infinitely extending three-dimensional network of $SiO_4$ and $[AlO_4]^{-1}$ tetrahedra linked through common oxygen atoms. The framework structure encloses cavities occupied by large ions and water molecules, both of which have considerable freedom of movement, permitting ion exchange and reversible dehydration. The isomorphic substitution of silicon by aluminum gives rise to a net negative charge compensated by cations. Zeolites can be represented by the formula:

$$M_{2/n}O \cdot Al_2O_3 \cdot xSiO_2 \cdot yH_2O$$

where M is the compensating cations with valence n, x is $\geq 2$, and y=10–10,000.

Different zeolites may have different Si/Al ratios and the tetrahedral $SiO_4$, $[AlO_4]^{-1}$ can also be isostructurally substituted by other elements such as Ga, Ge, Mn, Ti, and P, generating a molecular sieve. In an extreme case, zeolite molecular sieves may have a Si/Al ratio of infinity. Zeolite molecular sieves do not have a net negative framework charge, exhibit a high degree of hydrophobicity, and have no ion exchange capacity. Silicalite-1 and silicalite-2 are examples of such zeolite molecular sieves.

Silicalite-1 is the end-member of zeolite Pentasil, also referred to as zeolite ZSM-5. Silicalite-1 has the same structure as ZSM-5, but has a Si/Al ratio of infinity, with a high hydrophobicity and has no ion exchange capacity.

Zeolites have been used commercially in two different ways. In one way, zeolites are in the form of granules. These exhibit high porosity with a pore size between 3–12 Å, depending on the type of zeolite. Zeolite particles have been used in adsorption separation processes and in shape-selective catalytic processes. The adsorptive separation process on granular molecular sieves is a non-continuous batch process involving alternate adsorption and desorption, and has a low economic feasibility.

A second commercial use of zeolites has been with ceramic membranes. These exhibit high thermal, chemical and mechanical stability, and can be used in continuous separation processes. The economic advantage of using a membranous article having a zeolite surface which would allow carrying out such processes continuously have been recognized (U.S. Pat. No. 4,699,892). However, it has proved very difficult to produce a ceramic-zeolite membrane with a pore size of less than 10 Å (Goldsmith (1988) J. Membrane Sci. 39:197).

Zeolites have had a limited application as membrane materials for continuous separation processes. Only recently have studies demonstrated the potential of zeolites as filling materials for improving the performance of polymeric membranes, as membranes for separation, and for catalytic membrane reactor applications.

For example, Hennepe et al. (U.S. Pat. No. 4,925,562) describes a zeolite-filled polymer membrane in which hydrophobic silicalite-1 particles were homogeneously dispersed in a polydimethylsiloxane (PDMS) polymer. When used in a pervaporation process to separate alcohols from water, the membrane was shown to have improved properties of selectivity and flux. The extent of the improvement was proportional to the silicalite content of the filled membrane.

A method for synthesizing a continuous crystalline molecular sieve membrane without any carrier matrix is described by Haag et al. (U.S. Pat. No. 5,019,263 and U.S. Pat. No. 5,069,794). In one example, a Teflon plate is immersed at 453 K. for nine days in a precursor gel consisting of a mixture of tetrapropylammonium bromide, sodium hydroxide and colloidal silica. A uniform crystalline membrane was removed and calcined. Membranes synthesized by this method were 20–230 µm in thickness, had a XRD pattern characteristic of zeolite ZSM-5, and exhibited separation selectivities of 1.07 for $O_2/N_2$, 1.62 for $H_2/CO$, and 17.2 for n-hexane/2,2-dimethylbutane. Diffusivities for these components ranged between $1.14 \times 10^{-5} - 2.63 \times 10^{-4}$ $cm^2/s$.

A composite membrane having an ultrathin film of zeolite on a porous support of metal, inorganic, or polymeric material has been described by Suzuki (U.S. Pat. No. 4,699,892). This membrane acts as a molecular sieve by separating hydrocarbons of different chain lengths. For example, when an equimolar mixture of $CH_4$, $C_2H_2$ and $C_3H_8$ was introduced into the feed side, gas chromatographic (GC) analysis showed that 73.5 mol % $CH_4$, 26.0 mol % $C_2H_6$, and 0.5 mol % $C_3H_8$ were present on the separation side. No permeability values are provided for these membranes. The method of Suzuki was subsequently shown not to produce zeolite membranes of continuous coverage (European Patent Application Publication 481 660).

EP 481 660 describes the synthesis of a composite membrane comprised of crystals of zeo-type material on a porous support. The crystal growth was shown to be essentially continuous over the pores of the support and the zeolite material is crystallized and bonded directly to the support. This membrane was used for dehydration of aqueous alcohol solutions. Ceramic membranes offer many advantages over polymeric membranes, such as thermal, structural and chemical stabilities. However, unlike dense polymeric membranes, ceramic membranes are porous. It is difficult to produce ceramic membranes with pore sizes in the range of 10–30 Å, pore sizes of molecular dimensions useful for gas separation and pervaporation (Goldsmith (1988) supra). For this reason, ceramic membranes have not been used broadly in such processes.

Zeolite molecular sieves, having high porosities of about 30% of the total volume and definite pore sizes in the range of 3–12 Å, have been suggested to be good candidates for ceramic membranes. The difficulty remains on how to produce such zeolite membranes without non-zeolite micropores or defects. It would be advantageous to form a continuous zeolite layer on top of a ceramic layer with a resulting membrane of smaller pore size (e.g., 3–12 Å) for use in a continuous separation process.

Jia et al. (1993) J. Membrane Sci. 82:15, discloses the synthesis of silicalite membranes on ceramic disks. SEM and XRD analysis demonstrated a continuous silicalite thin layer formed on the surface of the disks. Single gas permeation studies showed that the calcined membranes had high permeances for lightly adsorbed gas molecules. Evidence of shape-selectivity was observed, since n-butane permeated six times faster than iso-butane.

BRIEF SUMMARY OF THE INVENTION

This invention discloses a method for preparing novel ceramic-zeolite membranes on the continuous inner surface of a container such as a cylinder. The method for preparing the continuous zeolite composite membranes of this invention comprises:

a) placing a zeolite-forming gel inside a substrate membrane container, the container having at least one opening, b) capping the end(s) of the container, c) placing the capped container in an autoclave and heating to the temperature of zeolite crystallization; and d) calcining the zeolite composite membrane to remove template molecules.

The method of the present invention results in the formation of a continuous zeolite layer on the inner surface of the substrate membrane container. This results from the removal of water from the gel by permeation through the container walls during crystallization.

This is the first time that a continuous stable zeolite membrane has been made in the inner wall of a container. The prior art attempts to make a zeolite membrane have been limited to flat sheet forms.

The continuous zeolite membrane of this invention is a significant improvement over prior art zeolite membranes. When the continuous zeolite membrane is formed inside a container such as a cylinder, the resulting membrane has a much higher surface area to volume ratio than conventional flat membranes. The zeolite membrane of the present invention may be formed in any container with at least one opening, for example, in cylindrical or hexagonal containers. Thus, vastly improved separations can be achieved in less space by the continuous membrane process of this invention than by conventional counterparts.

In the preferred embodiment of the invention, a membrane apparatus comprises means for providing a substrate. The substrate means have an inner wall, an interior region defined by the inner wall, an outer wall, at least one open end and a plurality of pores. A continuous zeolite film is operably attached to the inner wall of the substrate means for providing a relatively large permeation area per unit volume. The continuous zeolite film includes a plurality of channels and it is calcined so as to substantially remove the template which may otherwise obstruct the plurality of channels, to, in turn, enable relatively unobstructed permeation of a desired constituent therethrough.

In the preferred embodiment of the invention, the continuous zeolite film consists of silica and alumina. It is also preferred that the plurality of pores in the substrate means each have a pore diameter of approximately 5 nanometers, that the substrate means be composed of silica, and, that the substrate have a substantially cylindrical configuration—although other materials, pore diameters and configurations are also contemplated.

BRIEF DESCRIPTION OF THE FIGURES

FIG. 1 shows a scanning electron microscope (SEM) photograph of (a) the side view of an alumina membrane; (b) through (d) shows SEM photographs of the silicalite composite membrane, (b) and (c) are side views and (d) a top view.

FIG. 2 shows the XRD pattern of (a) a silicalite composite membrane and (b) the alumina membrane.

DETAILED DESCRIPTION OF THE INVENTION

Figure 4:
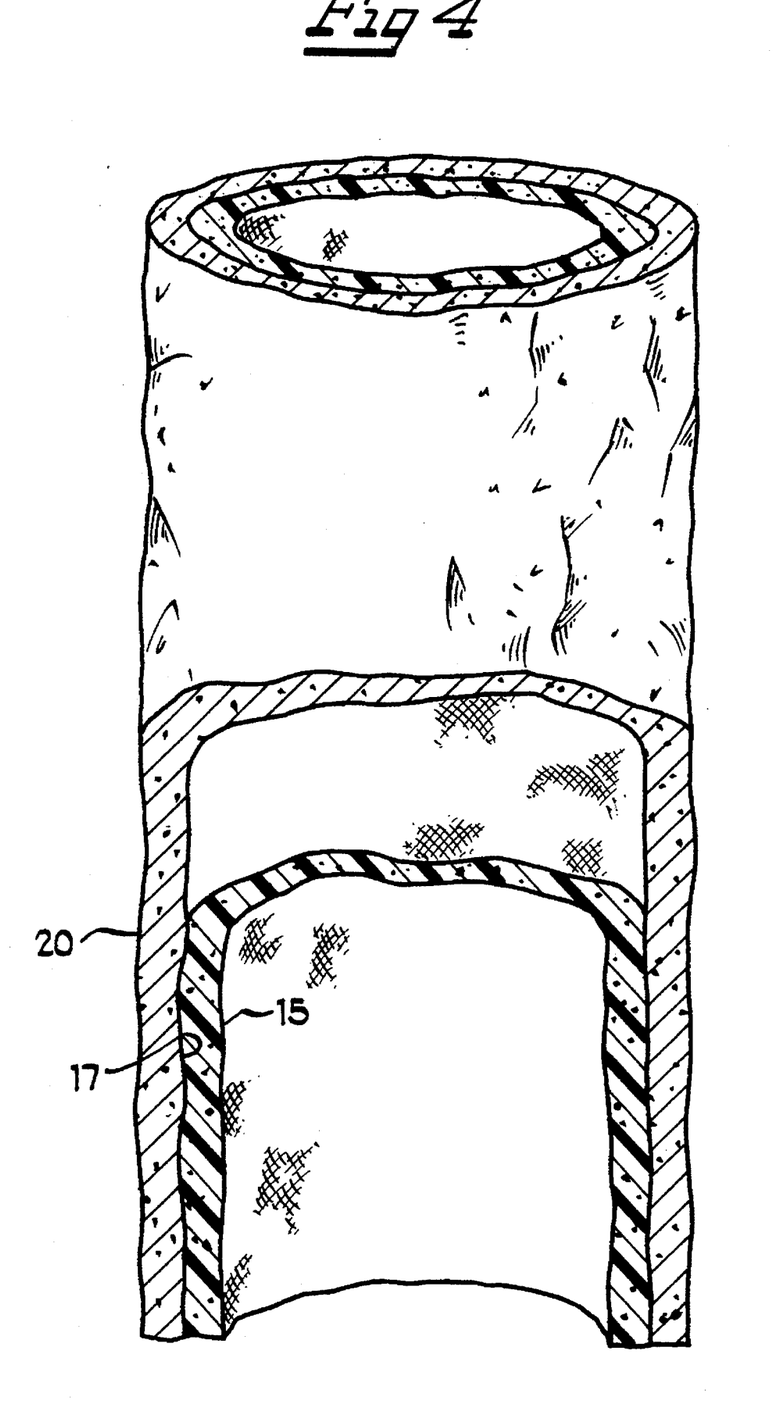
FIG. 4 shows an elevated partial cross-sectional view of the membrane apparatus.

The present invention describes a novel method for preparing ceramic-zeolite composite membranes with improved selectivity and permeability characteristics, as well as a novel membrane apparatus—as shown in FIG. 4.

Further, this invention describes the use of the novel ceramic-zeolite composite membrane for improved separation of vapor and gas mixtures.

The present invention describes a zeolite film 15 (FIG. 4) successfully grown on the inner wall 17 (FIG. 4) of a porous alumina membrane container ("substrate") 20 (FIG. 4). In the present case, the container is cylindrical, but the container may be of any shape, including cylindrical, hexagonal, etc. The formation of a continuous zeolite layer in the inner wall of a cylindrical container allows many such containers to be stacked, vastly increasing the surface area to volume ratio over that of conventional flat sheet membranes.

A novel feature of the zeolite membrane of this invention, as shown by scanning electron microscopy (SEM) photographs, is that the zeolite layer is continuous. As used in this application, the term "continuous" means there are no mechanical cracks or defects in the zeolite layer formed. There can and are grain bondaries, so that "continuous" does not imply a single crystal. In other words, the continuous zeolite membrane of this invention does not have non-zeolite micropores or defects.

Figure 3:
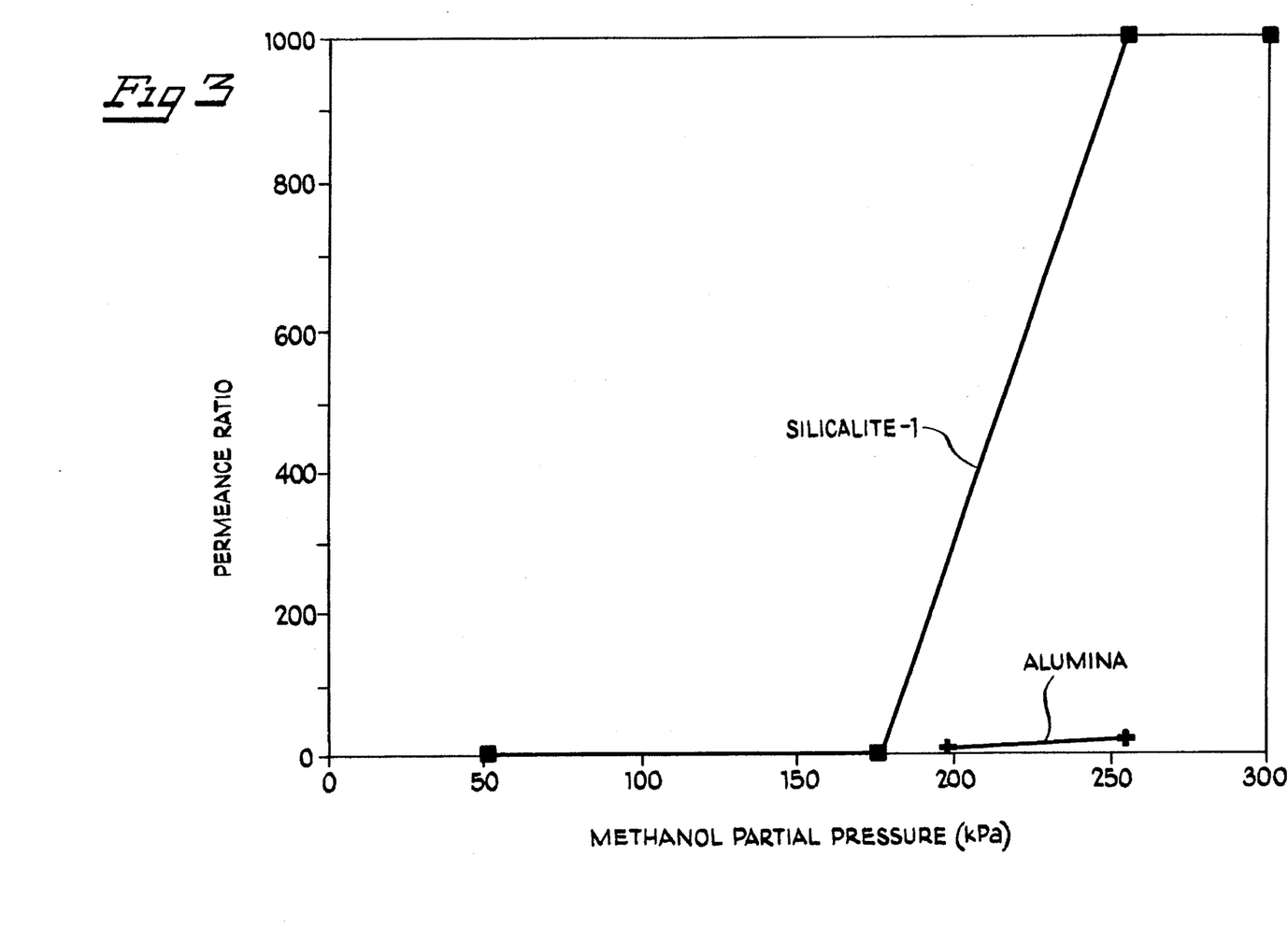
FIG. 3 shows the permeance ratio for silicalite and alumina membranes as a function of $CH_3OH$ partial pressure at the membrane's feed outlet.

XRD patterns indicate that the zeolite layer is composed of silicalite-1. The term "silicalite-1" as used in the application refers to zeolite Pentasil (silicalite-1; Si-rich ZSM-5). Crystals lying above the layer contribute to the XRD pattern; however, no other peaks appear in the XRD pattern and no amorphous background was observed. As shown in FIG. 3, the crystals do not lie physically on the surface of the layer, but are part of the layer.

A zeolite layer is formed by mixing a gel comprised of silicate, alumina powder and water, placing the gel on an organic template, and applying heat under high pressure to effect crystal formation. An important step in the synthetic process of the present invention is to create a condition such that water from the gel is continuously removed through the substrate membrane wall during synthesis. This may create a local supersaturation at the wall of the alumina cylinder, facilitating nucleation and crystal growth. As the silicalite layer is formed at the wall, the cylindrical membrane becomes less permeable since uncalcined silicalite is non-permeable. During synthesis, regions on the wall at which silicalite did not initially crystallize would retain permeability and tend to be filled by silicalite due to water permeation and supersaturation at those points. Crystallization may also take place within the pores and at the pore mouth of the permselective layer of the alumina membrane. This may be one reason for the intimate connection achieved between the silicalite layer and the permselective layer.

As described below, zeolite membranes of silicalite-1 were formed on the inner wall of cylindrical containers. The properties of the silicalite membrane was compared to that of the alumina substrate membrane.

Single gas permeances were measured in the silicalite and alumina membranes. For the silicalite membrane, no gas permeation can be detected at cross-membrane pressure of 30 psi before calcination, showing a defect free growth of the zeolite layer. After calcination at 738 K., $N_2$ permeance at room temperature was 20 times faster than that of $n-C_4H_{10}$, and $n-C_4H_{10}$ permeance at room temperature was 3 times faster than that of $i-C_4H_{10}$ showing that the silicalite membrane appears to be shape-selective (Table 1). $CH_3OH/H_2$ and $CH_2OH/CH_4$ mixture separation at 373 K. show high separation factors with $CH_3OH$ being the preferential permeate component. In contrast to the molecule sieving effect, this can be understood by the selective adsorption capability of the silicalite. $CH_3OH$ adsorbs much more readily in the silicalite channels than $H_2$ and $CH_4$. This adsorbed $CH_3OH$ transported through silicalite membrane and prevented $H_2$ or $CH_4$ from being transported.

EXAMPLE 1

SILICALITE MEMBRANE SYNTHESIS

A gel for synthesis of silicalite-1 was prepared according to the method of Grose and Flanigen (U.S. Pat. No. 4,061, 724). The gel was composed of silica (Aerosil 130, Degussa), sodium hydroxide (AR, Aldrich Chemical Co.), tetrapropylammonium bromide (TPABr) (AR, Aldrich Chemical Co.), and deionized water. A commercial Alcoa alumina cylindrical composite membrane with 5 nm diameter pores was used as the substrate. The cylinder had an inner diameter of 6.5 mm, an outer diameter of 10 mm, and a length of 84 mm.

In order to grow the silicalite layer only on the inner wall of the alumina membrane, the gel was transferred into the substrate cylinder such that the cylinder was filled with the gel, and both ends plugged with Teflon caps. The cylinder was placed vertically in a Teflon-lined autoclave and synthesis conducted at 453 K. under autogenous pressure for 12 h. The gel formed a continuous layer on the inner wall of the cylinder. After synthesis was completed, the cylinder membrane was washed thoroughly, dried at 383 K. overnight, and tested for $N_2$ permeation. A well-synthesized membrane is not permeable before calcination since the silicalite channels are blocked by TPABr. The synthetic process was repeated with those membranes found to be permeable. In cases where a second synthetic step was required, the membrane was in a reversed orientation. This helped to form the zeolite layer with a more even thickness throughout the cylinder length.

To remove TPABr from the silicalite channels, the membrane was calcined in air in a muffle oven with a slow heating rate (0.5 K./min) from room temperature to 738 K., then held at 738 K. for eight h. The heating conditions were sufficient to remove TPABr.

EXAMPLE 2

CHARACTERIZATION OF SILICALITE MEMBRANE

Diffraction patterns were obtained on a Siemens D5000 automated powder diffractometer using spotfocus Mo Kα (λ=0.0171073 nm) radiation from a rotating-anode X-ray generator operating at 45 kV and 200 mA. The spot-focus beam was collimated to approximately 0.5 mm in diameter. Cylindrical samples of the synthesized composite and the alumina membranes were cut so as to expose an interior section 5 mm×25 mm. The sample was mounted in jeweler's wax in a plastic holder so that the interior surface of the cylinder was flush with the surface of the plastic.

SEM photographs were obtained with an ISI-SX-30 scanning electron microscope. Cylindrical membranes were broken and fragments selected as samples. Photographs were taken of the cross section and inner surface to show the structure and morphology of the membrane.

Figure 1A:
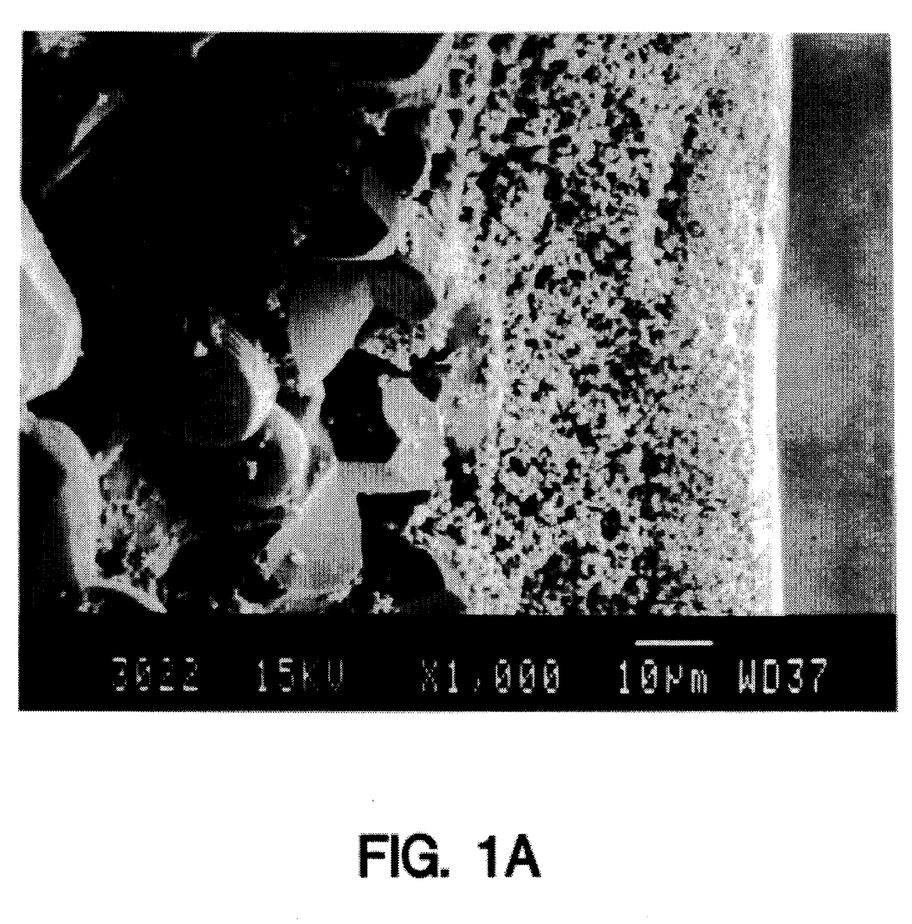
Figure 1B:
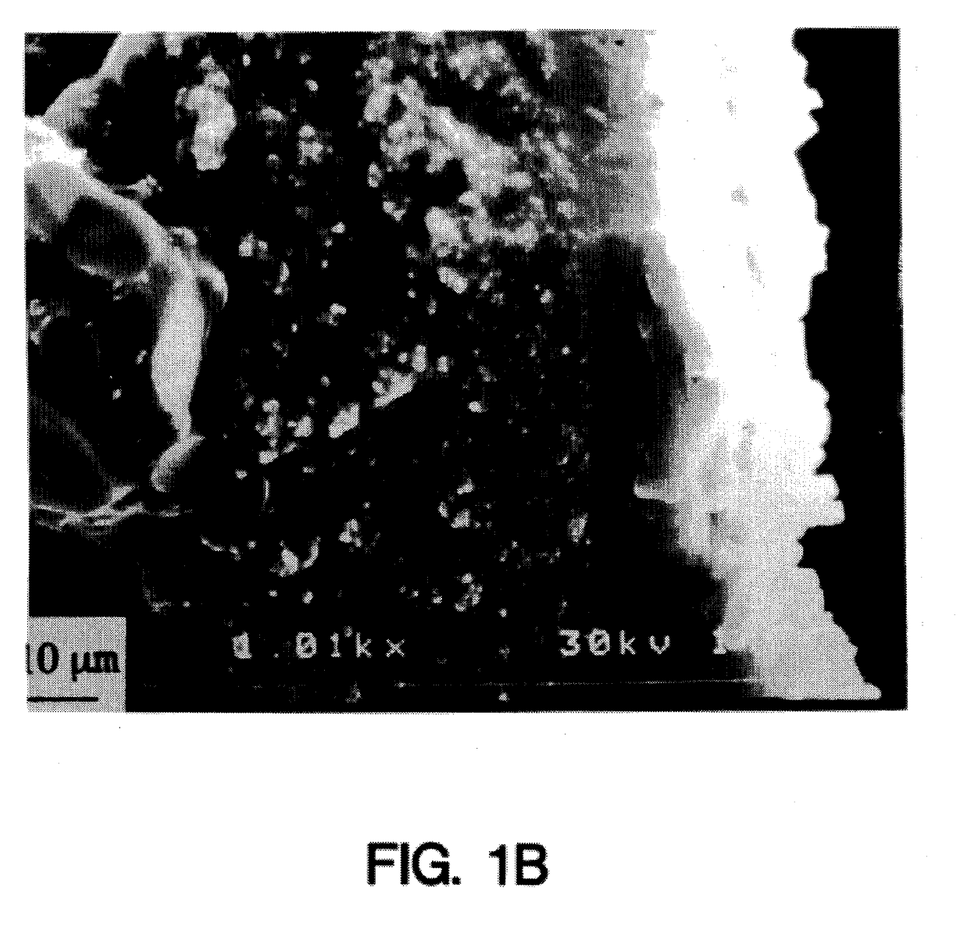
Figure 1C:
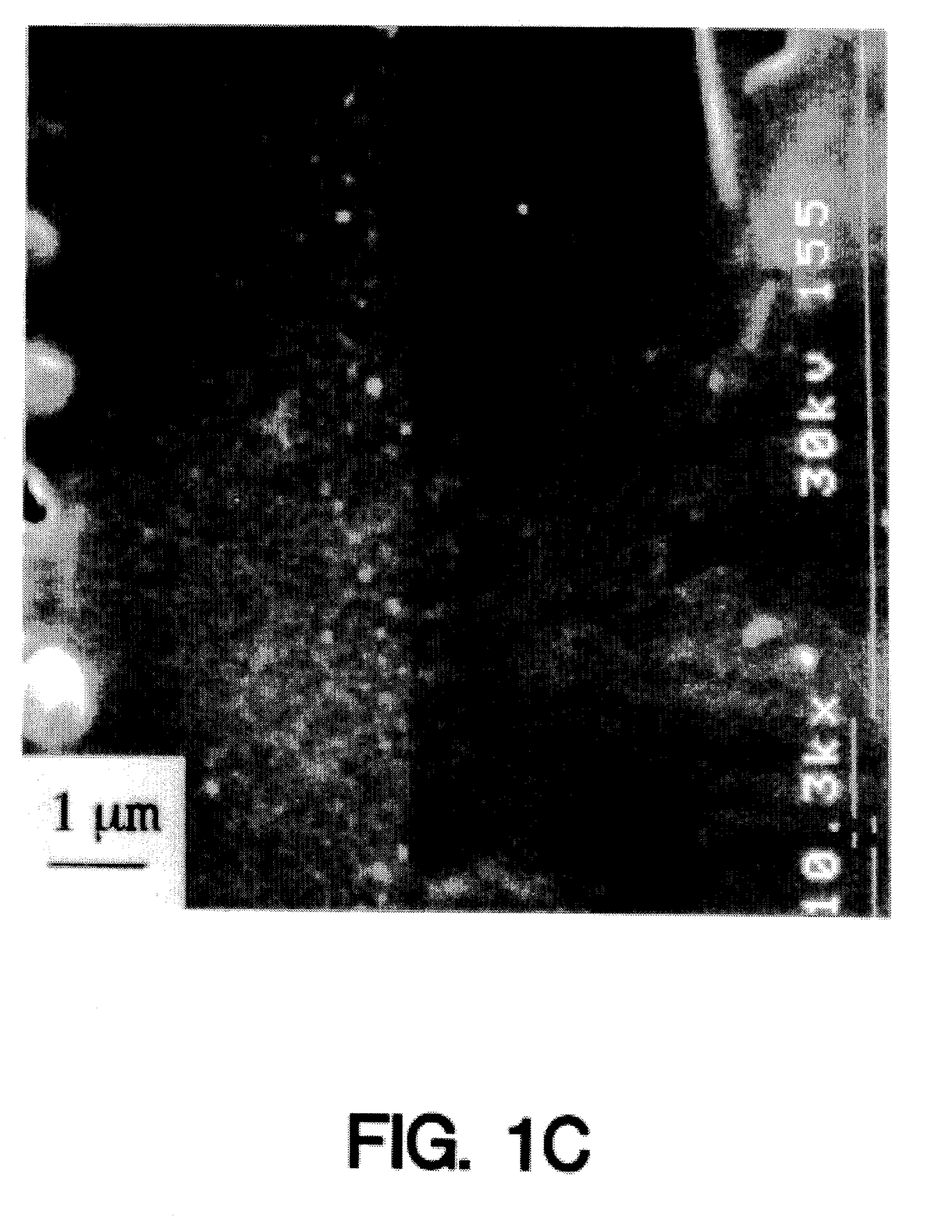
Figure 1D:
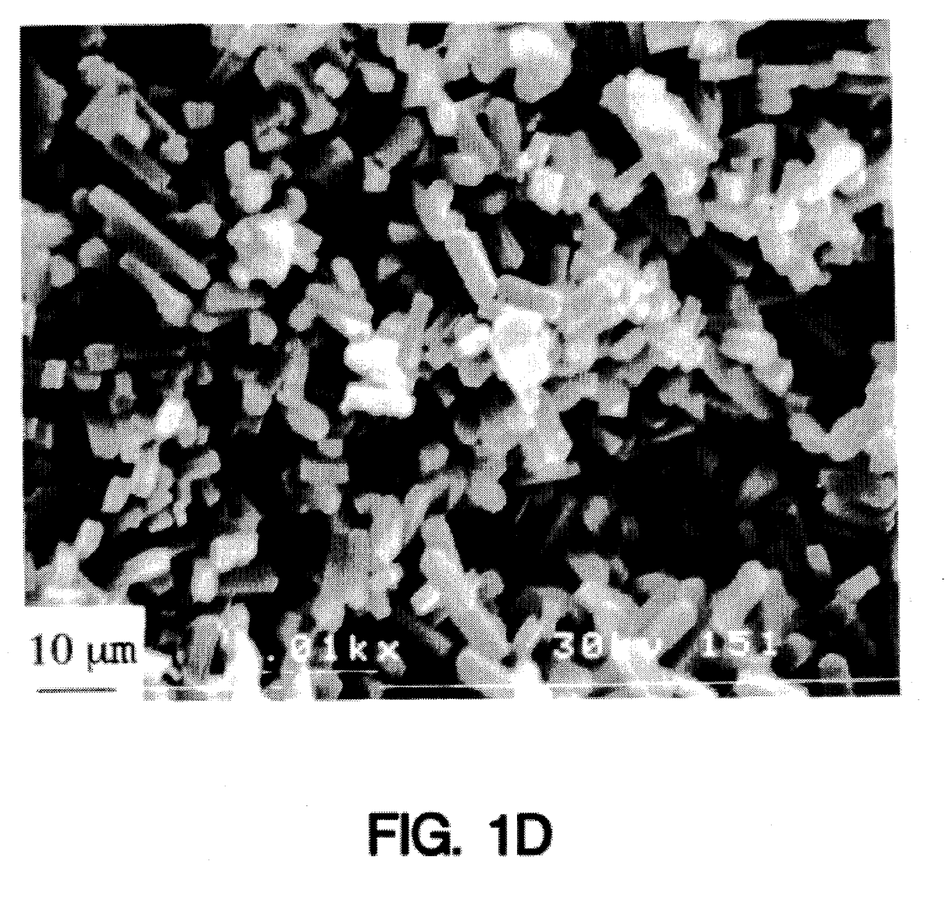

The asymmetric alumina membrane consists of a support and three inner layers of decreasing pore size. The innermost layer, the permselective layer, is approximately 5 μm thick and has 5 nm diameter pores. These layers are visible in the SEM photograph of FIG. 1(a). FIGS. 1(b) and (c) show SEM photographs of cross sections of a silicalite membrane deposited on the inner wall of thee alumina membrane. In FIG. 1(b), the transitional layers and the permselective layer of the alumina membrane are seen on the left. Apparently the in situ synthesis did not change the structure of the $\gamma-Al_2O_3$ layer in the alumina membrane. Shown on the right of FIG. 1(b), next to the permselective layer is the continuous silicalite layer. Although the membrane was calcined at 753 K. as described in Example 1, and broken to obtain the SEM sample, the silicalite layer remained in intimate contact with the alumina membrane and did not separate. Even at higher magnifications shown in FIG. 1(c) (10,000×), the silicalite layer appears continuous and securely attached to the permselective layer. The thickness of the continuous silicalite layer at the cross section is estimated to be approximately 10 μm. The silicalite layer appears to become less regular near the surface, and individual silicalite crystals are seen in a top view of the surface (FIG. 1(d)). Some of the crystals are part of the continuous layer and some are on top of the layer.

Figure 2A:
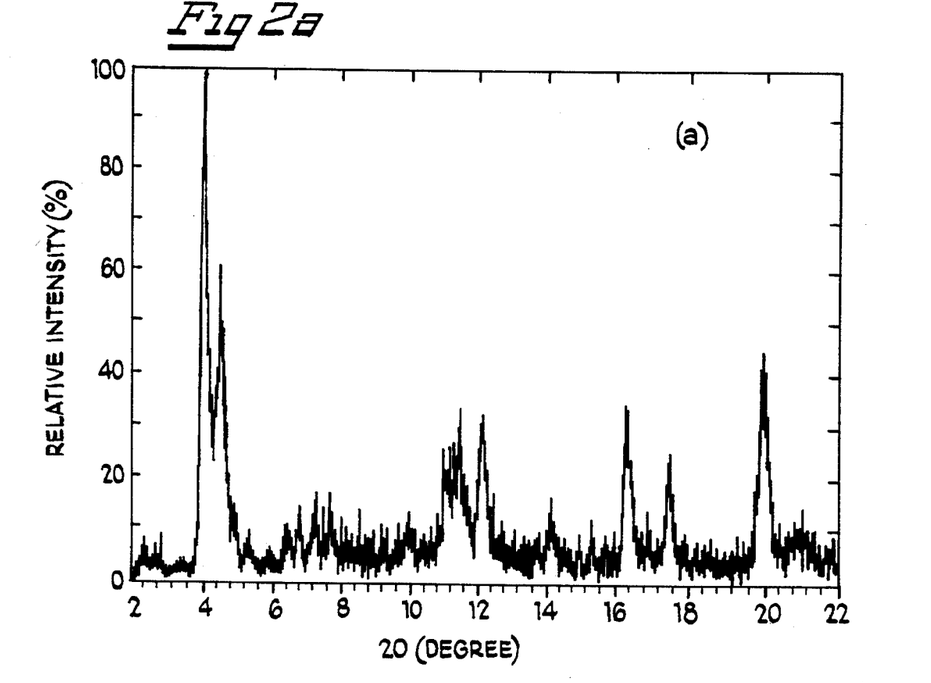
Figure 2B:
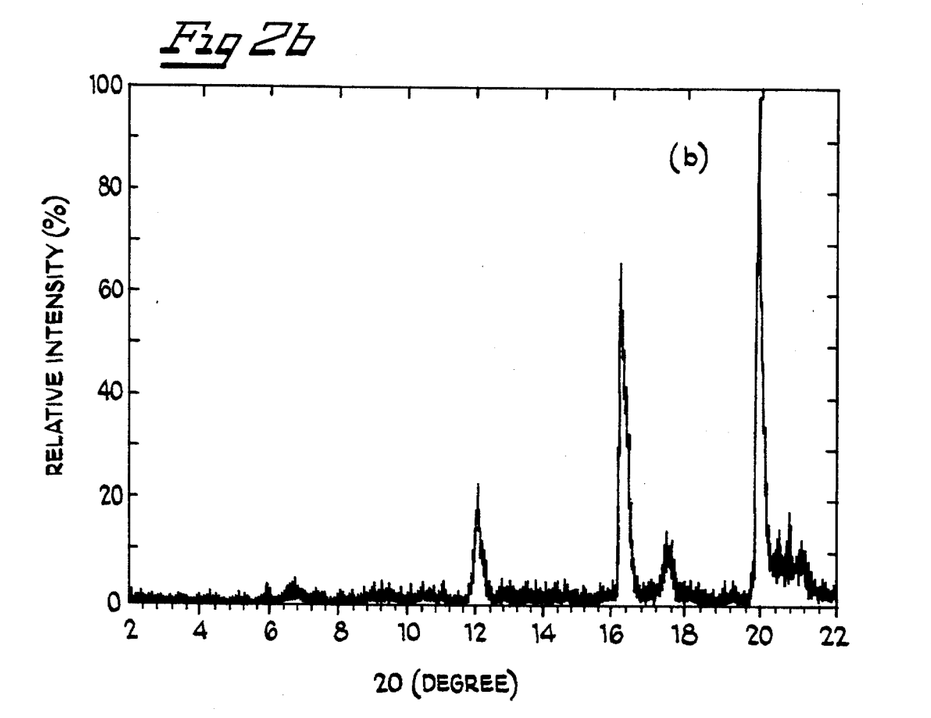

The XRD pattern of the silicalite composite layer (FIG. 2(a)) indicates the presence of silicalite and alumina phases only. The alumina substrate XR pattern is shown in FIG. 2(b) for comparison. The lack of significant background indicates that amorphous $SiO_2$ is not present in the silicalite layer.

EXAMPLE 3

SINGLE GAS PERMEATION EXPERIMENTS

Permeances were measured for both alumina and silicalite membranes by mounting the 84 mm axial length cylinders membranes in a gas permeation apparatus. The gas flow rate through the membrane was measured with a soap-film flow meter. All permeances were measured at 300 K. with feed pressures from 120–220 kPa. The permeate pressure was ambient (82 kPa). Measurements with each gas were repeated at least three times after constant flow rates had been obtained. All synthesized silicalite membranes were tested for $N_2$ or He permeation. Membranes with no permeation, considered to be free of defects, were calcined and used for single gas test and gas mixture separations.

Table 1 shows permeances for an alumina membrane and the silicalite composite membrane for several gases. For the alumina membrane, the permeance rations of $N_2/He$ and $N_2/H_2$ were close to those expected for Knudsen diffusion. Permeances of $n-C_4H_{10}$ and $i-C_4H_{10}$ were equal and twice as high as that of $N_2$, apparently because butane transport was enhanced by surface diffusion (Kapoor et al. (1989) Cat. Rev. Sci. Engl. 31:129); Haraya et al. (1986) J. Chem. Eng.

Jap. 19:186). The addition of the silicalite layer decreased the permeances of all gases studied, as shown in Table 1. For $N_2$ and He, the permeances were factors of 5 to 6 smaller than for the substrate, and the He/$N_2$ permeance ratio was slightly lower than the substrate membrane. The permeances of n-$C_4W_{10}$ and i-$C_4H_{10}$ however, were factors of 190 and 500 lower through the silicalite membrane, and the n-$C_4H_{10}$/i-$C_4H_{10}$ permeance ratio was 3.1. The greatest uncertainty in calculated permeance value was for i-butane which took a longer time than other gases to reach steady state.

The $N_2$ permeance of the silicalite composite membrane, when measured immediately after the butane measurements, was a factor of 20 smaller than the value in Table 1. It recovered slowly with time, but did not reach its initial value unless the silicalite membrane was calcined again at 623 K. This result indicates that the butanes adsorbed into the pores of the silicalite layer and blocked $N_2$ transport.

EXAMPLE 4

VAPOR/GAS MIXTURE SEPARATION EXPERIMENTS

Vapor/gas mixtures were separated in a high temperature high-pressure separation apparatus. The 84 mm axial length silicalite composite membrane was lengthened to 240 mm by bonding a non-porous alumina cylinder on each side with clear epoxy glue (Devcon Corp.). Because of the thermal stability limit of the epoxy, membranes could only be used below 393 K. Stainless steel ferrules were bonded to each non-porous alumina cylinder, and Kalrez O-rings attached to the ferrules provided the seal between the feed and sweep sides. Each membrane had a permeation area of 820 mm² Comparison measurements were made between the substrate Alcoa composite membrane and the synthesized silicalite composite membrane.

$CH_3OH$ was completely vaporized and mixed with $H_2$ or $CH_4$ in a preheater at 513 K. The mixture was introduced into the separation module. The composition of the feed mixture was controlled by adjusting the flow rate of each component. The flow rates of $H_2$ and $CH_4$ were regulated by mass flow controllers, while $CH_3OH$ was fed into the system by a liquid metering pump. A pulse dampener was used to reduce the flow fluctuations. Total feed flow rates of 250–300 cm³/min were used. Helium was employed as the purge gas flowing on the sweep side. This flow rate was kept at 200 cm³/min unless otherwise stated. The total pressure difference across the membrane was kept close to zero.

A gas chromatograph (Hewlett-Packard model 5790A) was used to analyze the composition of the vapor/gas mixture at the feed inlet, feet outlet, and sweep outlet. An automatic value alternately sampled the feed and sweep compositions without interfering with their flows. Each separation run was conducted ten times and average values and standard deviations of the separation factors and permeances were calculated from the fluxes and compositions of the ten runs. The separation factor ($\alpha$) is defined as:

$$\alpha = (cCH\ OH/cH_2)sweep\ (cCH_3OH^3CH_2)retentate$$

The permeance ($P_i$) of the individual components is defined as:

$$P_i = (F.C_i)sweep\ (A.P_{total} \cdot \Delta_{m,i})$$

where F is the flow rate in the sweep side, $C_i$ is the concentration of component i in the sweep side, A is the membrane permeation area, and $P_{total}$ is the total pressure. The logarithmic-mean concentration difference ($\Delta_{m,i}$) of component i between the feed and sweep sides is defined as:

$$\Delta_{m,i} = \Delta C_1 - \Delta C_2 ln(\Delta C_1/\Delta C_2)$$

The logarithmic-mean concentration difference is used for counter-current flow in tubes, were $\Delta C_1$ and $\Delta C_2$ are the mean concentration differences across the membrane at the tube inlet and outlet, respectively.

Table 2 shows the compositions and separation factors of $CH_3OH/H_2$ at 373 K. for alumina membrane. Both $H_2$ and $CH_3OH$ permeated through the membrane at 373 K., but the $CH_3OH$ permeance was higher and $CH_3OH/H_2$ permeance ratios as high as 20 were measured. A small amount of He appeared to permeate from the sweep side to the feed side. The He concentrate in the retentate, however, was estimated from the mass balance, since the GC could not detect He.

At 373 K., the saturation pressure of $CH_3OH$ is 340 kPa and the partial pressures of $CH_3OH$ in the feed inlet for the experiments in Table 2 were 270 and 375 kPa, but the feed outlet partial pressure of $CH_3OH$ were only 200 and 250 kPa. These values are well below the saturation pressure and they are also below 293 kPa, which is the $CH_3OH$ saturation vapor pressure in 5 nm pores calculated from the Kelvin equation (Noble et al. (1993) J. Membrane Sci. 79:123). Thus, the pores of the alumina membrane were not expected to be filled completely by $CH_3OH$, and $H_2$ is also expected to permeate, as was observed.

The silicalite membrane showed behavior similar to the alumina membrane (Table 3). As the total feed pressure increased, the permeance ratio and the separation factor increased. However, the permeance ratio was much higher for the silicalite membrane. At total feed pressures higher than 772 kPa, no $H_2$ was detected in the sweep. Based on the GC sensitivity for $H_2$, the permeance ratio was estimated to be greater than 1000. The $CH_3OH$ partial pressures in the feed inlet for the last two runs were 360 and 520 kPa, but the $CH_3OH$ partial pressures in the feed outlet where 255 and 300 kPa, corresponding to 74% and 88% partial $CH_3OH$ saturation pressures, respectively. The Kelvin equation yields a maximum pore diameter of 2.5 nm for a vapor pressure of 255 kPa.

For both membranes, the $CH_3OH$ permeance increased as the $CH_3OH$ partial pressure increased and $CH_3OH$ permeance was 4 times higher than for the silicalite membrane. At lower $CH_3OH$ concentrations and higher pressures (Table 4), similar changes were observed but selectivities were lower. For example, a $CH_3OH/H_2$ permeance ratio of 26 was measured for a $CH_3OH$ feed outlet partial pressure of 165 kPa.

Similar behavior was observed for separation of $CH_3OH$/$CH_4$ mixtures with the silicalite membrane, as shown in Table 9. As the $CH_3OH$ partial pressure increased, the $CH_4$ Permeance dropped while the $CH_3OH$ permeance increased. A $CH_3OH/CH_4$ permeance ratio as high as 230 was measured at a total pressure of 772 kPa. Separation factors and permeance ratios for $CH_3OH/CH_4$ mixtures were lower than those for $CH_3OH/H_2$ mixtures under the same conditions.

Thermal stability. The thermal stability of the silicalite membrane was checked by cycling between 293 and 773 K. twice. After each temperature cycle, the $N_z$, He, n-$C_4H_{10}$ and i-$C_4H_{10}$ permeances were the same, indicating that the silicalite membrane has a good thermal stability up to 773 K.

Differences between the silicalite and alumina membranes for the permeation ratio for the separation of $CH_3OH$/$H_2$ mixtures is shown in FIG. 3.

TABLE 1

SINGLE GAS PERMEANCES (P) AND PERMEANCE RATIOS AT 298 K.

| | $N_2$ | $H_2$ | He | $n\text{-}C_4H_{10}$ | $i\text{-}C_4H_{10}$ |
|---|---|---|---|---|---|
| Alumina Membrane | | | | | |
| Permeance ($10^{-7}$ mol/m²/s/Pa) | 67.3 | 217 | 164 | 147 | 146 ± 6 |
| Permeance Ratio $P_i/P_{N2}$ | 1 | 3.24 | 2.43 | 2.2 | 2.2 ± 0.11 |
| SILICALITE MEMBRANE | | | | | |
| Permeance ($10^{-7}$ mol/m²/s/Pa) | 15.6 | 44 | 26.7 | 0.77 | 0.25 ± 0.01 |
| Permeance Ratio $P_i/P_{N2}$ | 1 | 2.8 | 1.7 | 0.05 | 0.016 ± 0.001 |

TABLE 2

SEPARATION OF $CH_3OH/H_2$ MIXTURES USING AN ALUMINA MEMBRANE AT 373 K.

| Total Feed Pressure | $CH_3OH$ Partial Pressure (kPa) | | Permeance ($10^{-7}$ mol/m²/s/Pa) | | Permeance Ratio | Separation Factor |
|---|---|---|---|---|---|---|
| (kPa) | Feed In | Feed Out | $H_2$ | $CH_3OH$ | $P_{CH3OH}/P_{H2}$ | α |
| 600 | 270 | 198 | 0.09 ± 0.02 | 0.70 ± 0.04 | 8.6 ± 1.8 | 12 ± 2.6 |
| 772 | 355 | 255 | 0.11 ± 0.02 | 2.2 ± 0.23 | 20 ± 4.9 | 23 ± 6.7 |

TABLE 3

SEPARATION OF $CH_3OH/H_2$ MIXTURES USING A SILICALITE COMPOSITE MEMBRANE AT 373 K.

| Total Feed Pressure | $CH_3OH$ Partial Pressure (kPa) | | Permeance ($10^{-7}$ mole/m²/s/Pa) | | Permeance Ratio | Separation Factor |
|---|---|---|---|---|---|---|
| (kPa) | Feed In | Feed out | $H_2$ | CH3OH | $P_{CH3OH}/P_{H2}$ | α |
| 110 | 52 | 52 | 0.11 ± 0.02 | 0.30 ± 0.09 | 3.0 ± 0.12 | 3.8 ± 1.5 |
| 358 | 175 | 175 | 0.32 ± 0.04 | 0.93 ± 0.31 | 3.0 ± 1.3 | 3.7 ± 1.7 |
| 772 | 363 | 255 | 0 | 0.56 ± 0.11 | >1000 | >1000 |
| 1110 | 522 | 300 | 0 | 1.8 ± 0.61 | >1000 | >1000 |

TABLE 4

SEPARATION OF $CH_3OH/H_2$ MIXTURES USING A SILICALITE COMPOSITE MEMBRANE AT 373 K.

| Total Feed Pressure | $CH_3OH$ Partial Pressure (kPa) | | Permeance ($10^{-7}$ mole/m²/s/Pa) | | Permeance Ratio | Separation Factor |
|---|---|---|---|---|---|---|
| (kPa) | Feed In | Feed Out | $H_2$ | CH3OH | $P_{CH3OH}/P_{H2}$ | α |
| 1500 | 24 | 180 | 0.18 ± 0.04 | 0.7 ± 0.4 | 3.9 ± 1.4 | 5.6 ± 1.8 |
| 2200 | 352 | 189 | 0.08 ± 0.05 | 1.3 ± 0.4 | 20 ± 11 | 28 ± 13 |
| 770 | 208 | 200 | 0.25 ± 0.03 | 1.0 ± 0.2 | 3.9 ± 1.1 | 3.7 ± 1.4 |
| 1100 | 297 | 286 | 0.04 ± 0.01 | 0.6 ± 0.2 | 16 ± 6.4 | 17 ± 9.7 |
| 1500 | 405 | 165 | 0.07 ± 0.01 | 1.8 ± 0.1 | 26 ± 3.4 | 29 ± 3.7 |

TABLE 5

SEPARATION OF CH$_3$OH/CH$_4$ MIXTURES USING A SILICALITE COMPOSITE MEMBRANE AT 373 K.

| Total Feed Pressure | CH$_3$OH Partial Pressure (kPa) | | Permeance (10$^{-7}$ mole/m$^2$/s/Pa) | | Permeance Ratio | Separation Factor |
|---|---|---|---|---|---|---|
| (kPa) | Feed In | Feed Out | CH$_4$ | CH3OH | P$_{CH3OH}$/P$_{CH4}$ | α |
| 427 | 196 | 205 | 0.31 ± 0.12 | 0.47 ± 0.04 | 1.9 ± 1.0 | 2.3 ± 1.2 |
| 720 | 355 | 301 | 0.01 ± 0.005 | 2.9 ± 0.79 | 230 ± 88 | 160 ± 53 |
| 1110 | 444 | 222 | 0.01 ± 0.005 | 1.7 ± 0.33 | 140 ± 54 | 190 ± 89 |

We claim:

1. A method for synthesizing a continuous zeolite membrane comprising:

a) placing a zeolite-forming gel inside a porous substrate membrane container, said container having at least one opening and an inner wall;

b) capping the end(s) of the container;

c) heating the capped container, and, in turn, forcing water within the gel to permeate through the pores of the substrate container thereby forming a continuous zeolite layer on the inner wall of the substrate container, and d) calcining the zeolite layer.

2. The method of claim 1 wherein said zeolite-forming gel is comprised of silica and alumina.

3. The method of claim 1 wherein said substrate membrane container is composed of alumina.

4. The method of claim 3, wherein said alumina substrate composite membrane container has a coating of γ-Al$_2$O$_3$ on said inner surface.

5. The method of claim 1 wherein said substrate membrane container is composed of silica.

6. The method of claim 1 wherein said substrate membrane container has a pore diameter of approximately 5 nanometers (nm).

7. A continuous zeolite membrane produced by the method of claim 1.

8. A zeolite composite membrane formed by the method of claim 1 wherein the zeolite composite membrane has the structural formula:

M$_{2/n}$O.Al$_2$O$_3$.xSiO$_2$.yH$_2$O wherein M is the compensating cations with valence n, x is ≧2, and y=10–10,000.

9. The method of claim 1 wherein said container is a cylinder.

10. A membrane apparatus consisting of:

means for providing a substrate, said substrate means having an inner wall, an interior region defined by said inner wall, an outer wall, at least one open end and a plurality of pores; and an inner coating comprising a continuous zeolite film operably attached to said inner wall of said substrate means for providing a relatively large permeation area per unit volume, said continuous zeolite layer emanating from said inner wall of said substrate means and toward said interior region, without any significant attachment or positioning of said continuous zeolite layer within said plurality of pores, said continuous zeolite film including a plurality of unobstructed channels.

11. The invention according to claim 10, wherein said continuous zeolite film consists of silica and alumina.

12. The invention according to claim 10, wherein at least a portion of said plurality of pores in said substrate means each have a pore diameter of approximately five nanometers (nm).

13. The invention according to claim 10, wherein said substrate means is composed of silica.

14. The invention according to claim 10, wherein said substrate means has a substantially cylindrical configuration.

* * * * *